US009804770B2

(12) United States Patent
Tanaka

(10) Patent No.: US 9,804,770 B2
(45) Date of Patent: Oct. 31, 2017

(54) DISPLAY CONTROLLER AND ELECTRONIC APPARATUS FOR CHANGING A BRIGHTNESS OF A DISPLAY IN RESPONSE TO A SENSED DEPRESSION OF AN INSTRUCTION IMAGE ON THE DISPLAY

(71) Applicant: KYOCERA Document Solutions Inc., Osaka-shi, Osaka (JP)

(72) Inventor: Yoko Tanaka, Osaka (JP)

(73) Assignee: KYOCERA Document Solutions Inc. (JP)

(*) Notice: Subject to any disclaimer, the term of this patent is extended or adjusted under 35 U.S.C. 154(b) by 77 days.

(21) Appl. No.: 14/782,861

(22) PCT Filed: Jan. 26, 2015

(86) PCT No.: PCT/JP2015/052038
§ 371 (c)(1),
(2) Date: Oct. 7, 2015

(87) PCT Pub. No.: WO2015/115370
PCT Pub. Date: Aug. 6, 2015

(65) Prior Publication Data
US 2016/0054886 A1    Feb. 25, 2016

(30) Foreign Application Priority Data
Jan. 29, 2014    (JP) .................................. 2014-014655

(51) Int. Cl.
*G06F 3/041*    (2006.01)
*G06F 3/0488*   (2013.01)
(Continued)

(52) U.S. Cl.
CPC .......... *G06F 3/0488* (2013.01); *G06F 1/3265* (2013.01); *G06F 3/016* (2013.01);
(Continued)

(58) Field of Classification Search
CPC ...... G06F 3/0488; G06F 3/041; G06F 3/0414; G06F 3/04842; G06F 3/048; G06F 3/016; G06F 1/3265
(Continued)

(56) References Cited

U.S. PATENT DOCUMENTS

2002/0149561 A1   10/2002   Fukumoto et al.
2006/0109256 A1   5/2006    Grant
(Continued)

FOREIGN PATENT DOCUMENTS

JP    H07253769 A     10/1995
JP    2002-149312     5/2002
(Continued)

OTHER PUBLICATIONS

European Search Report dated October 7, 2016.
International Search Report.

*Primary Examiner* — Jonathan Blancha
(74) *Attorney, Agent, or Firm* — Gerald E. Hespos; Michael J. Porco; Matthew T. Hespos

(57) ABSTRACT

Disclosed is a display controller (100) which includes: a display section (74) operable to display thereon an operation screen (W) at a predetermined reference brightness, wherein the operation screen (W) has one or more instruction images (T1, T2, T3) arranged thereon and each depressable to input a specific operator instruction; a depression detection section (12) operable to detect a depression of each of the instruction images (T1, T2, T3); and a brightness adjustment section (14) operable, when a depression of one (T1) of the instruction images is detected by the depression detection section (12), to change brightness of the operation screen (W) from the reference brightness by a change amount preliminarily associated with the one instruction image (T1).

3 Claims, 10 Drawing Sheets

(51) Int. Cl.
*G06F 3/048* (2013.01)
*G06F 3/01* (2006.01)
*G06F 3/0484* (2013.01)
*G09G 5/10* (2006.01)
*G06F 1/32* (2006.01)

(52) U.S. Cl.
CPC .............. *G06F 3/041* (2013.01); *G06F 3/048* (2013.01); *G06F 3/0414* (2013.01); *G06F 3/04842* (2013.01); *G09G 5/10* (2013.01); *Y02B 60/1242* (2013.01)

(58) Field of Classification Search
USPC ......................................................... 345/173
See application file for complete search history.

(56) References Cited

U.S. PATENT DOCUMENTS

| | | | |
|---|---|---|---|
| 2006/0119586 A1 | 6/2006 | Grant | |
| 2009/0039801 A1* | 2/2009 | Huang | H05B 41/39 315/307 |
| 2009/0251716 A1* | 10/2009 | Igarashi | G03G 15/655 358/1.12 |
| 2010/0250984 A1 | 9/2010 | Lee | |
| 2011/0102325 A1 | 5/2011 | Sato et al. | |
| 2011/0219302 A1* | 9/2011 | Kondo | G06F 3/0416 715/702 |
| 2012/0036378 A1* | 2/2012 | Lee | G06F 1/263 713/320 |
| 2012/0299857 A1 | 11/2012 | Grant | |
| 2013/0070444 A1* | 3/2013 | Krohn | G09F 13/04 362/97.1 |
| 2014/0267101 A1* | 9/2014 | Iwaki | G06F 3/048 345/173 |
| 2015/0116344 A1* | 4/2015 | Won | G09G 3/32 345/589 |
| 2015/0268766 A1* | 9/2015 | Kim | G06F 3/044 345/174 |

FOREIGN PATENT DOCUMENTS

| | | |
|---|---|---|
| JP | 2005338162 A | 12/2005 |
| JP | 2006-18582 | 1/2006 |
| JP | 2009-9519 | 1/2009 |
| JP | 2010-258799 | 11/2010 |
| JP | 2011-100259 | 5/2011 |

* cited by examiner

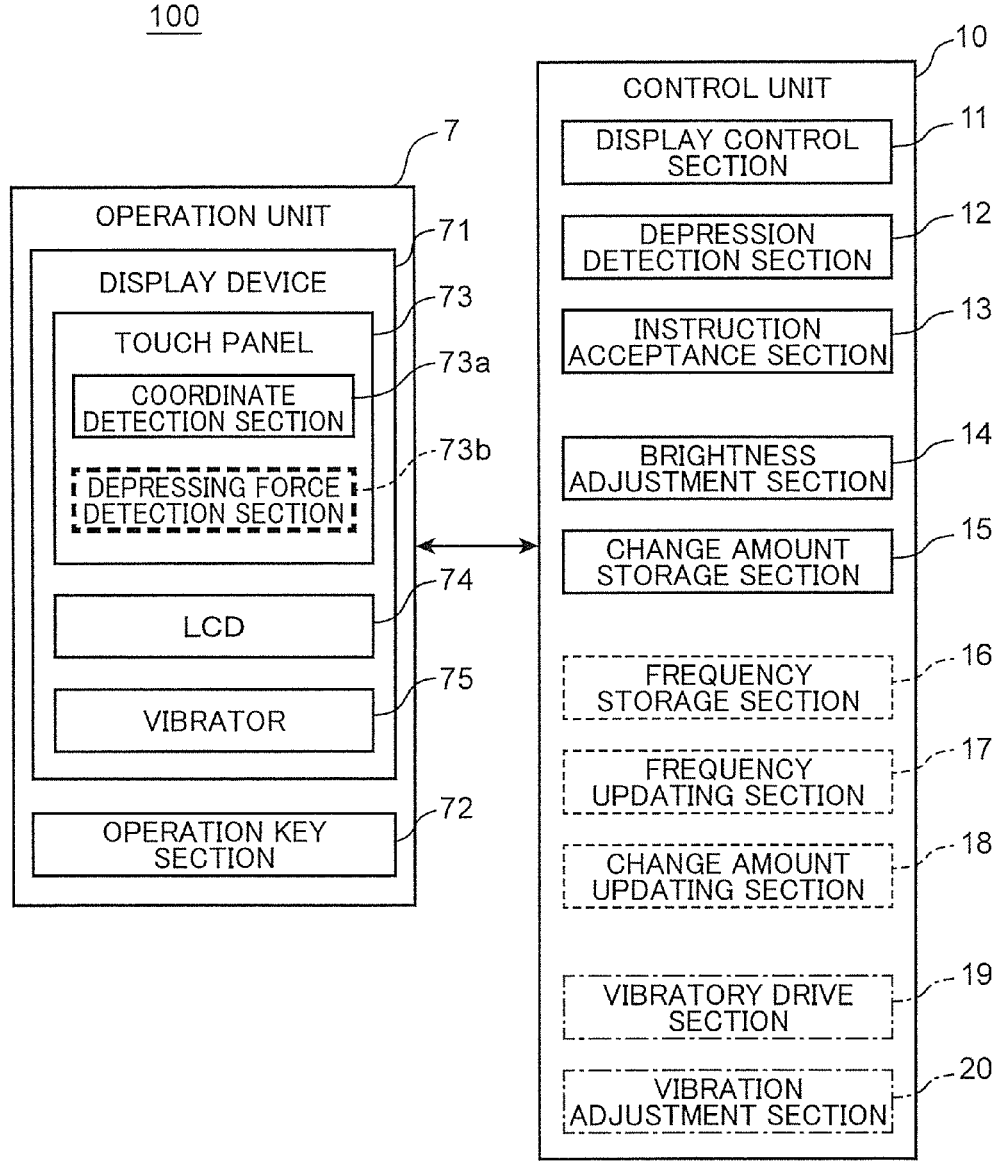

FIG.5

| SOFTKEY | CHANGE AMOUNT |
|---------|---------------|
| T1 | 2 |
| T2 | 1 |
| T3 | 0 |

FIG.7

| SOFTKEY | CUMULATIVE NUMBER OF TIMES OF DEPRESSION |
|---|---|
| T1 | 10 |
| T2 | 5 |
| T3 | 1 |

FIG.8

| SOFTKEY DEPRESSING FORCE P | UPDATING DEGREE U |
|---|---|
| P<P1 | 0 |
| P1≦P<P2 | 1 |
| P2≦P | 2 |

DISPLAY CONTROLLER AND ELECTRONIC APPARATUS FOR CHANGING A BRIGHTNESS OF A DISPLAY IN RESPONSE TO A SENSED DEPRESSION OF AN INSTRUCTION IMAGE ON THE DISPLAY

TECHNICAL FIELD

The present invention relates to a display controller, and an electronic apparatus comprising the display controller, and more particularly to a technique of allowing a user to recognize what the user has operated.

BACKGROUND ART

Heretofore, an electronic apparatus equipped with a touch panel has been known. For example, JP 2011-100259A describes a keyboard unit configured by laminating a transmissive touch panel, a symbol printed film printed with a plurality of symbols for inputting, and a backlight device for illuminating the symbol printed film, which are arranged in this order from the side of a top surface thereof. This keyboard unit is further provided with a vibration motor configured to be activated in conjunction with detection of a touch on the touch panel. It is described that, by this means, when an operator touches the touch panel so as to input one or more of the symbols, the fact that the touch panel has been touched is informed to the operator.

JP 2006-18582A describes an operation display unit in which a touch panel is installed over an LCD. This operation display unit is further provided with a driving member for giving vibration to the touch panel. It is described that, when an operator operates a specific region where a selection operation is preliminarily prohibited (selection prohibition region) in an operation screen, the vibration is given to the touch panel. It is described that, by this means, when an operator is performing a prohibited selection operation, a warning is informed to the operator.

In a situation where a user depresses a softkey (instruction image), such as a button depressable to input an operator instruction, a touch panel can be vibrated by using the above conventional techniques. This allows the user to recognize a fact that an input of the operator instruction through a touch on the touch panel has been done. However, the user cannot quickly recognize what kind of operator instruction has been input, unless a specific operation screen unique to each operator instruction is displayed in response to input of the operator instruction, for example.

It is an object of the present invention to provide a display controller and an electronic apparatus which are capable of allowing a user to quickly recognize what kind of operator instruction has been input.

SUMMARY OF INVENTION

According to one aspect of the present invention, there is provided a display controller which includes: a display section operable to display thereon an operation screen at a predetermined reference brightness, wherein the operation screen has one or more instruction images arranged thereon and each depressable to input a specific operator instruction; a depression detection section operable to detect a depression of each of the instruction images; and a brightness adjustment section operable, when a depression of one of the instruction images is detected by the depression detection section, to change brightness of the operation screen from the reference brightness by a change amount preliminarily associated with the one instruction image.

According to another aspect of the present invention, there is provided an electronic apparatus which includes: the above display controller; and an instruction acceptance section operable, when a depression of one of the instruction images is detected by the depression detection section, to accept the specific operator instruction indicated by the one instruction image.

The present invention can provide a display controller and an electronic apparatus which are capable of allowing a user to quickly recognize what kind of operator instruction has been input.

BRIEF DESCRIPTION OF DRAWINGS

FIG. 2 is a block diagram illustrating an electrical configuration of a display controller according to one embodiment of the present invention.

FIG. 5 is an explanatory diagram illustrating one example of a set of change amounts associated with respective softkeys.

FIG. 7 is an explanatory diagram illustrating one example of a depression detection frequency of each softkey.

FIG. 8 is an explanatory diagram illustrating one example of a relationship between a depressing force of a softkey and a degree of updating a change amount.

DESCRIPTION OF EMBODIMENTS

First Embodiment

Figure 1:
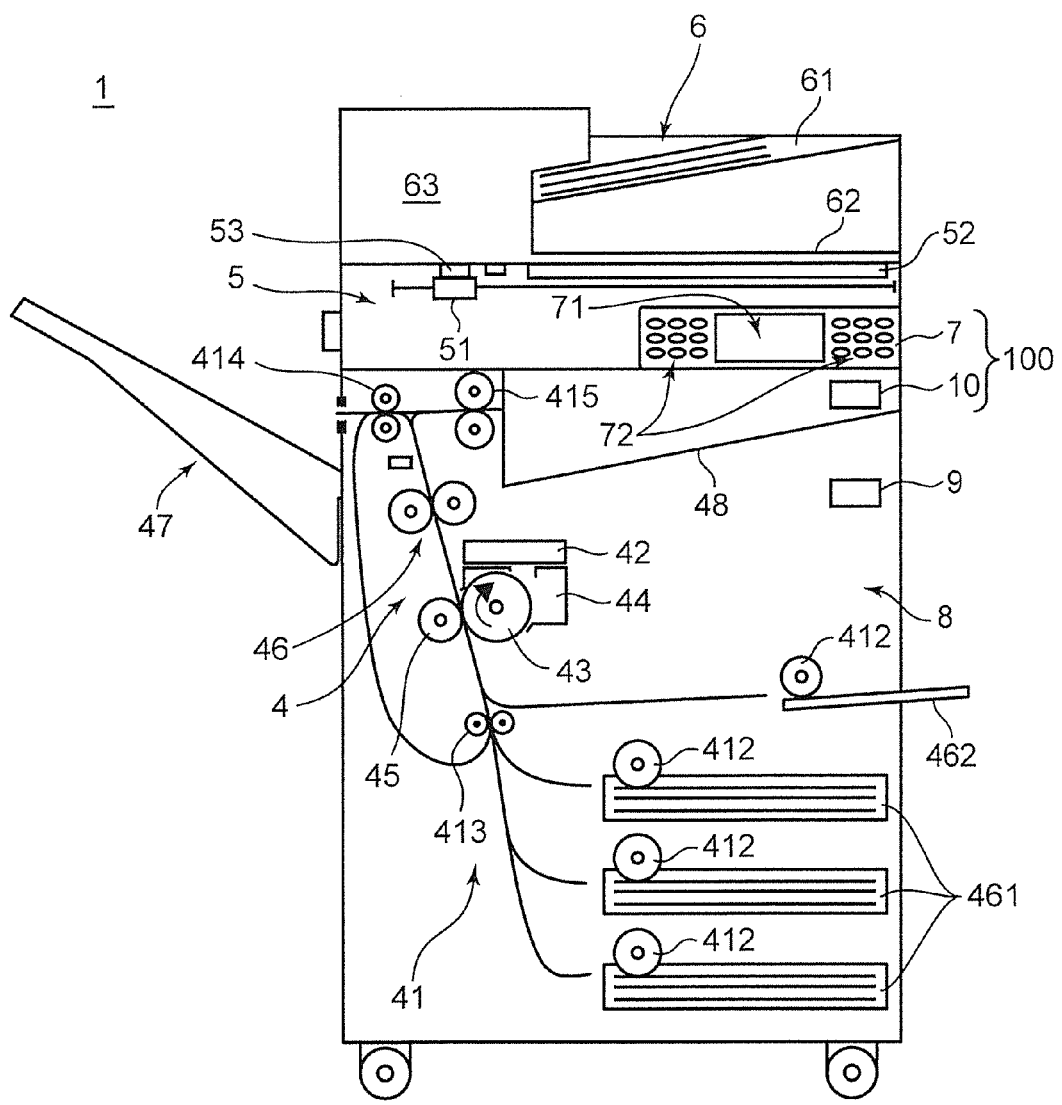
FIG. 1 is a schematic configuration diagram of an electronic apparatus according to one embodiment of the present invention.

Based on the drawings, one embodiment of an electronic apparatus according to the present invention will now be described. FIG. 1 is a schematic configuration diagram of a complex machine 1 (electronic apparatus) according to one embodiment of the present invention. As illustrated in FIG. 1, the complex machine 1 comprises a document scanning unit 5, a document feeding unit 6, a machine body 8, and an operation unit 7.

The document scanning unit 5 is disposed on a top portion of the machine body 8. The document scanning unit 5 comprises: a scanner 51 comprising an exposing lamp and a CCD (Charge Coupled Device); and a platen 52 and a document scanning slit member 53 each composed of a transparent member such as glass.

The scanner 51 is configured to be movable according to a non-illustrated drive unit. In an operation for scanning a document placed on the platen 52, the scanner 51 is operable to move along a surface of the document at positions opposed to the platen 52 to scan the document while outputting acquired image data to an aftermentioned control unit 10. On the other hand, in an operation for scanning a document fed from the document feeding unit 6, the scanner 51 is shifted to a position opposed to the document scanning slit member 53. Then, the scanner 51 is operable to acquire image data of the document through the document scanning slit member 53, in synchronization with a conveyance movement of the document according to the document feeding unit 6, and output the image data to the aftermentioned control unit 10.

The document feeding unit 6 is disposed just above the document scanning unit 5. The document feeding unit 6 comprises: a document loading section 61 for allowing one or more documents to be loaded thereon; a document ejecting section 62 for allowing the document after being image-scanned to be ejected thereto; and a document conveying mechanism 63. The document conveying mechanism 63 is operable to feed out one or more documents loaded on the document loading section 61 one-by-one, and, after conveying the document to a position opposed to the document scanning slit member 53, eject the image-scanned document to the document ejecting section 62.

The machine body 8 comprises: a plurality of sheet cassettes 461; a plurality of sheet feed rollers 412 each for feeding out sheets from a respective one of the sheet cassettes 461 and a manual feed tray 462 one-by-one and conveying the fed sheet to an aftermentioned image forming unit 4; an image forming unit 4 for forming an image on the sheet conveyed thereto; and a stack tray 47 and en ejection tray 48 each for allowing the image-formed sheet to be ejected thereto. Further, the machine body 8 is internally provided with a communication unit 9 and a control unit 10.

The image forming unit 4 comprises a sheet conveyance section 41, an optical scanning device 42, a photosensitive drum 43, a developing section 44, a transfer section 45, and a fixing section 46.

The sheet conveyance section 41 is provided in a sheet conveyance passage within the image forming unit 4. The sheet conveyance section 41 comprises: a conveyance roller 413 for supplying a sheet conveyed from each of the sheet feed rollers 412, to the photosensitive drum 43; a conveyance roller 414 for conveying a sheet to the stack tray 47; a conveyance roller 415 for conveying a sheet to the ejection tray 48, and the like.

The optical scanning device 42 is operable, based on image data input into the control unit 10, to output a laser beam. Specifically, the optical scanning device 42 is operable to scan the photosensitive drum 43 with the laser beam to thereby form an electrostatic latent image on the photosensitive drum 43.

The developing section 44 is operable to cause toner to adhere to the electrostatic latent image on the photosensitive drum 43 to thereby form a toner image thereon. The transfer section 45 is operable to transfer the toner image onto a sheet. The fixing section 46 is operable to heat the sheet having the toner image transferred thereon, to fix the toner image on the sheet.

The operation unit 7 comprises a display device 71 for displaying information thereon, and an operation key section 72 for allowing a user to input various operator instructions therethrough.

The communication unit 9 is connected to a network such as a LAN (Local Area Network), and/or a telephone line. The communication unit 9 is operable to perform communications with an external device such as a personal computer or a facsimile machine. For example, the communication unit 9 is operable to transmit image data scanned by the document scanning unit 5, to another facsimile machine, via a telephone line. The communication unit 9 is also operable to receive image data transmitted from another facsimile machine via a telephone line. Further, the communication unit 9 is operable to transmit image data scanned by the document scanning unit 5, to an external device, via a network. The communication unit 9 is also operable to receive image data transmitted from an external device via a network.

The control unit 10 is connected to each of the document scanning unit 5, the document feeding unit 6, the image forming unit 4, the operation unit 7 and the communication unit 9. The control unit 10 is operable to govern control for respective operations of the above units. It should be noted that the control unit 10 and the operation unit 7 constitute a display controller 100 according to one embodiment of the present invention.

For example, the control unit 10 comprises: a CPU (Central Processing Unit); a ROM (Read Only Memory) preliminarily storing therein various programs to be executed by the CPU, data necessary for the execution and others; a RAM (Random Access Memory) serving as a so-called "working memory" for the CPU; and peripheral circuits thereof.

Figure 3A:
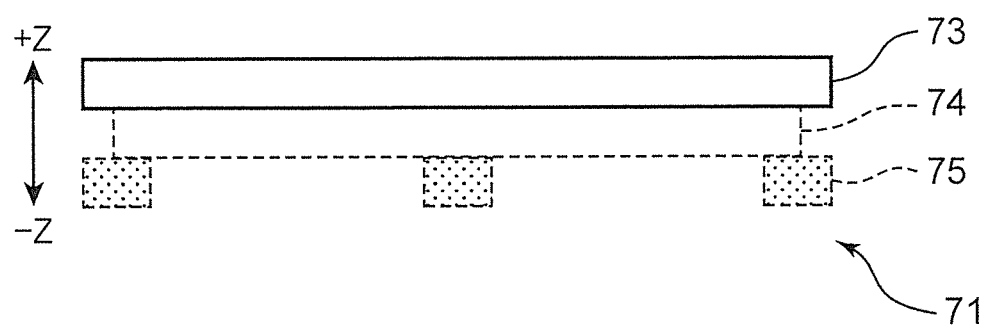
FIG. 3A is a schematic sectional view of a display device.
Figure 3B:
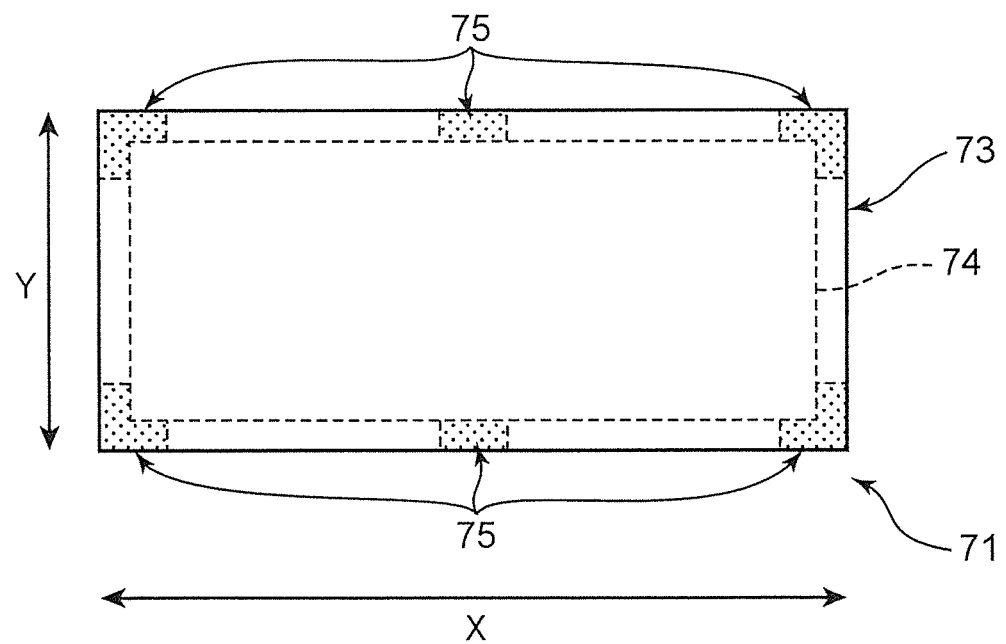
FIG. 3B is an external view of the display device, when viewed downwardly from thereabove.

The display controller 100 will be described in detail below. FIG. 2 is a block diagram illustrating an electrical configuration of the display controller 100 according to one embodiment of the present invention. FIG. 3A is a schematic sectional view of the display device 71. FIG. 3B is an external view of the display device 71, when viewed downwardly from thereabove (from a +Z directional side of the Z direction illustrated in FIG. 3A).

As illustrated in FIG. 2, the operation unit 7 comprises the display device 71 and the operation key section 72, as mentioned above. As illustrated in FIG. 3A, the display device 71 is configured by laminating a touch panel 73, a liquid crystal display (hereinafter referred to as "LCD") 74 (display section), and a vibrator 75, in this order in a downward direction from an upper side thereof (from the +Z directional side of the Z direction illustrated in FIG. 3A).

For example, the touch panel 73 has a capacitive type sensor. It should be noted that the touch panel 73 is not limited to the configuration having a capacitive type sensor, but may be a configuration having a resistive type sensor. The touch panel 73 functions as a coordinate detection section 73a, as illustrated in the block surrounded by the solid line in FIG. 2. The coordinate detection section 73a is operable, when a user touches a surface of the touch panel 73, to detect a position where a variation in electrostatic capacitance appears. Then, the coordinate detection section 73a is operable to output a detection signal which indicates the detected position in the form of a two-dimensional coordinate system having an X-axis and a Y-axis illustrated in FIG. 3B, to the control unit 10.

The LCD 74 comprises a non-illustrated liquid crystal panel and a backlight. In the liquid crystal panel, a group of liquid crystal molecules oriented in a given direction are disposed on a per-pixel basis. The backlight is composed, for example, of an LED (Light Emitting Diode), and provided on a lower side (on a −Z directional side of the Z direction illustrated in FIG. 3A) with respect to the liquid crystal panel).

An electric field to be applied to each of the groups of liquid crystal molecules (liquid crystal groups) in the liquid crystal panel is adjusted by an aftermentioned display control section 11. The backlight is operable, under control of the aftermentioned display control section 11, to illuminate the entire surface of the liquid crystal panel from below the liquid crystal panel. That is, each of the liquid crystal groups is controlled to allow illumination light from the backlight to be transmitted therethrough or blocked thereby, so that an image composed of a plurality of pixels corresponding to respective ones of the liquid crystal groups is displayed on the surface of the liquid crystal panel.

The vibrator 75 is composed, for example, of a piezoelectric element. As illustrated in FIG. 3B, the vibrator 75 is provided in a number of six, wherein the six vibrators 75 are disposed on a lower side (on the −Z directional side of the Z direction illustrated in FIG. 3A) with respect to the LCD 74, respectively, at four corners of the LCD 74 and two middle positions of upper and lower sides of the LCD 74. Each of the vibrators 75 is operable, when an electric signal (current or voltage) is given thereto from an aftermentioned vibratory drive section 19, to be vibrated in an up-down direction (in the Z direction illustrated in FIG. 3) with an amplitude corresponding to a signal level of the electric signal. Thus, the vibrators 75 can vibrate the entire LCD 74.

The operation key section 72 is composed of a variety of hardkeys for allowing a user to input various operator instructions therethrough. For example, the operation key section 72 comprises hardkeys such as a start key for allowing a user to input an instruction for start of execution of each function, and character keys for allowing a user to input numerals, symbols or the like.

In order to control an operation of the operation unit 7, the control unit 10 functions as a display control section 11, a depression detection section 12, an instruction acceptance section 13, a brightness adjustment section 14 and a change amount storage section 15, as illustrated in the blocks each surrounded by the solid line in FIG. 2.

The display control section 11 is operable to display an operation screen on the LCD 74 at a predetermined reference brightness, wherein the operation screen has one or more softkeys (instruction images) arranged thereon and each depressable to input a specific operator instruction.

Figure 4:
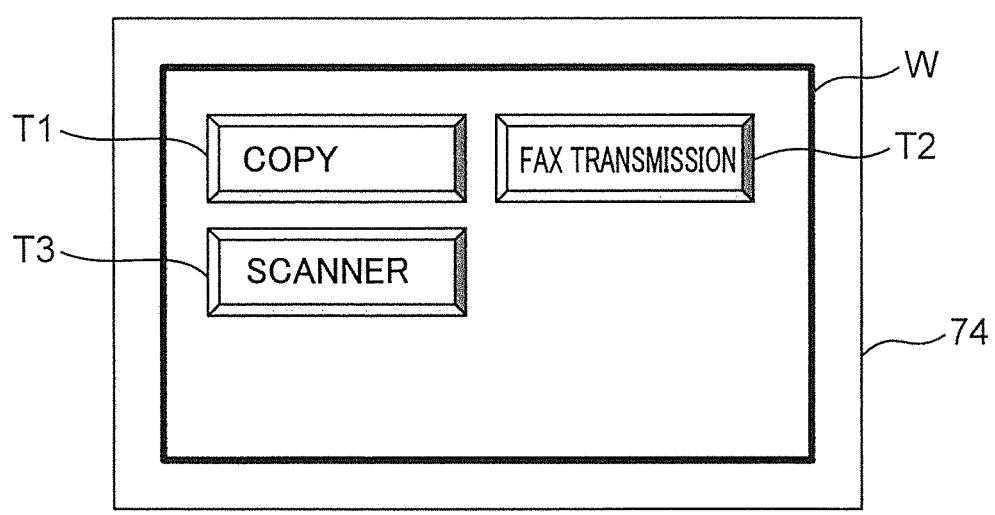
FIG. 4 is an explanatory diagram illustrating one example of an operation screen.

FIG. 4 is an explanatory diagram illustrating one example of the operation screen W. As illustrated in FIG. 4, for example, the operation screen W is configured such that a softkey T1 for inputting an instruction for performing an operation of setting a copy function, a softkey T2 for inputting an instruction for performing an operation of setting a facsimile transmission function and a softkey T3 for inputting an instruction for performing an operation of setting a scanner function are arranged thereon. An image representing the operation screen W is preliminarily stored in the ROM or the like.

The copy function means a function of causing the document scanning unit 5 and/or the document feeding unit 6 to scan a document image, and causing the image forming unit 4 to form the scanned image on a sheet. The facsimile transmission function means a function of causing the document scanning unit 5 and/or the document feeding unit 6 to scan a document image, and causing the communication unit 9 to transmit the scanned image to an external facsimile machine. The scanner function means a function of causing the document scanning unit 5 and/or the document feeding unit 6 to scan a document image, and storing the scanned image in the RAM or the like or causing the communication unit 9 to transmit the scanned image to an external device such as a personal computer.

The display control section 11 is operable to acquire an image representing the operation screen W to be displayed on the LCD 74, from the ROM or the like. Then, the display control section 11 is operable to adjust an electric signal (current or voltage) to be supplied to the liquid crystal panel to thereby adjust a magnitude of an electric field to be applied to each of the liquid crystal groups corresponding to respective pixels composing the acquired image. Then, the display control section 11 is operable to adjust an electric signal (current or voltage) to be supplied to the backlight to thereby illuminate the entire surface of the liquid crystal panel at a predetermined reference brightness. In this way, the operation screen W is displayed on the LCD 74. In the following description, an electric signal to be supplied from the display control section 11 to the backlight so as to display the operation screen W at the reference brightness will be referred to as "reference brightness signal".

The depression detection section 12 is operable, based on a coordinate position indicated by the detection signal output from the coordinate detection section 73a, to detect that one of the softkeys included in the operation screen W has been depressed. Specifically, for example, assume that a user has touched the softkey T1, as illustrated in FIG. 4. In this case, the coordinate detection section 73a (FIG. 2) is operable to output a detection signal indicative of a coordinate position within a region where the softkey T1 is displayed. The depression detection section 12 is operable to acquire the image representing the operation screen W from the ROM or the like, and, when it determines that the coordinate position indicated by the direction signal corresponds to one of the pixels representing the softkey T1, to detect that the softkey T1 has been depressed.

The instruction acceptance section 13 is operable, when a depression of one of the softkeys is detected by the depression detection section 12, to accept an operator instruction indicated by the depressed softkey. For example, assume that a depression of the softkey T1 (FIG. 4) is detected by the depression detection section 12. In this case, the instruction acceptance section 13 is operable to accept the instruction for performing the copy function setting operation, indicated by the softkey T1. The instruction acceptance section 13 is operable, in response to accepting the instruction for performing the copy function setting operation, to instruct the display control section 11 to display an operation screen performing the copy function setting operation.

The brightness adjustment section 14 is operable, when the depression detection section 12 detect a depression of one of the softkeys, to change brightness of the operation screen W from the reference brightness by a change amount preliminarily associated with the depressed softkey. The change amount storage section 15 is composed, for example, of a part of a storage area of the RAM. The change amount storage section 15 stores therein a set of change amounts to be used by the brightness adjustment section 14, in such a manner that they are associated with respective softkeys included in the operation screen W.

Figure 5:
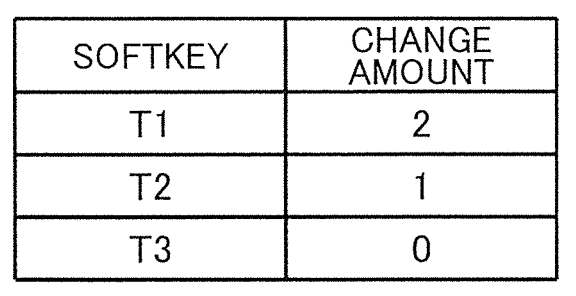

FIG. 5 is an explanatory diagram illustrating one example of a set of change amounts associated with respective softkeys. For example, as illustrated in FIG. 5, the ROM stores therein information indicating a change amount "2" in association with the softkey T1 (FIG. 4), information indicating a change amount "1" in association with the softkey T2 (FIG. 4), and information indicating a change amount "0" in association with the softkey T3 (FIG. 4). The information stored in the ROM is read by the control unit 10 in an initial stage of activation of the complex machine 1, and stored in the change amount storage section 15.

Figure 6:
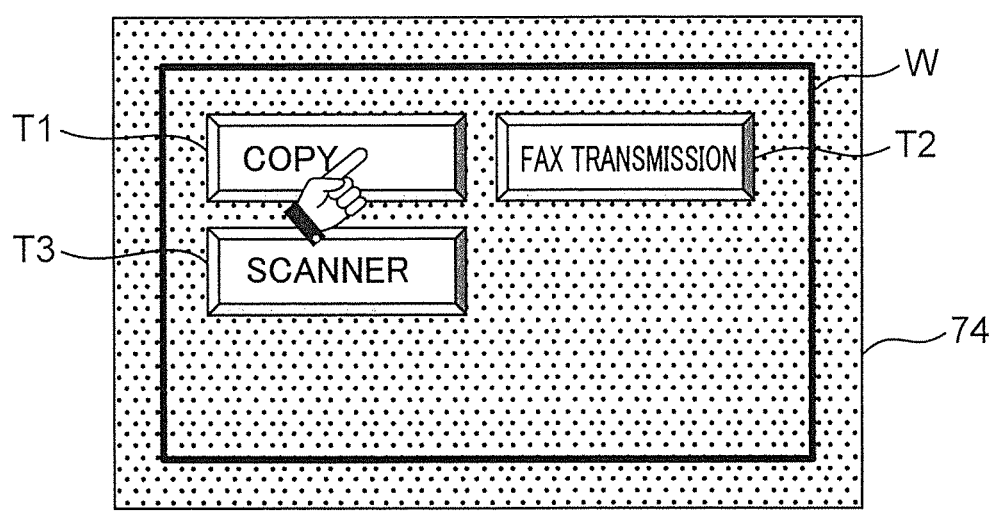
FIG. 6 is an explanatory diagram illustrating one example of a change in brightness of the operation screen.

For example, assume that a depression of the softkey T1 is detected by the depression detection section 12 in a situation where the operation screen W is displayed on the LCD 74 at the reference brightness as illustrated in FIG. 4. In this case, the brightness adjustment section 14 is operable to acquire the information indicating the change amount "2"

associated with the softkey T1, from the change amount storage section 15. Then, the brightness adjustment section 14 is operable, based on the change amount "2" indicated by the acquired information, to instruct the display control section 11 to supply an electric signal having a signal level greater than, e.g., 1.2 times greater than, that of the reference brightness signal, to the backlight. FIG. 6 is an explanatory diagram illustrating one example of a change in brightness of the operation screen W. As a result, the brightness of the operation screen W becomes higher than the reference brightness by an amount corresponding to the change amount "2", as illustrated in FIG. 6.

Further, assuming that a depression of the softkey T2 is detected by the depression detection section 12, the brightness adjustment section 14 is operable to acquire the information indicating the change amount "1" associated with the softkey T2, from the change amount storage section 15. Then, the brightness adjustment section 14 is operable, based on the change amount "1" indicated by the acquired information, to instruct the display control section 11 to supply an electric signal having a signal level greater than that, e.g., 1.1 times greater than, that of the reference brightness signal, to the backlight. As a result, the brightness of the operation screen W becomes higher than the reference brightness by an amount corresponding to the change amount "1".

On the other hand, assuming that a depression of the softkey T3 is detected by the depression detection section 12, the brightness adjustment section 14 is operable to acquire the information indicating the change amount "0" associated with the softkey T3, from the change amount storage section 15. In this case, the change amount indicated by the acquired information is "0". Thus, the brightness adjustment section 14 is operable to instruct the display control section 11 to successively supply an electric signal having the same signal level as that of the reference brightness signal, to the backlight. As a result, the brightness of the operation screen W becomes higher than the reference brightness by an amount corresponding to the change amount "0". That is, the brightness of the operation screen W is maintained at the same value as that of the reference brightness.

Alternatively, instead of setting the brightness of the operation screen W to become higher than the reference brightness by the change amount associated with a depressed one of the softkeys, as described above, the brightness adjustment section 14 may be configured to set the brightness of the operation screen W to become lower than the reference brightness by the change amount associated with a depressed one of the softkeys. In this case, the brightness of the operation screen W becomes lower than the reference brightness by an amount corresponding to the change amount.

Further, the change amounts stored in the change amount storage section 15 are not limited to numerical values equal to or greater than 0, as described above. For example, the change amounts stored in the change amount storage section 15 may include a numerical value less than 0 (i.e., a negative numerical value). In conformity thereto, the brightness adjustment section 14 may be configured to, when a change value associated with a depressed one of the softkeys is a numerical value less than 0, instruct the display control section 11 to supply an electric signal having a signal level less than that of the reference brightness signal by an amount corresponding to an absolute value of the change amount.

As above, according to the features of the first embodiment, when a user depresses one of the softkeys so as to input an operator instruction, the brightness of the operation screen W is changed depending on the depressed softkey by a corresponding one of the change amounts associated with the respective softkeys. Thus, a user can quickly recognize which of the softkeys has been depressed, i.e., what kind of operator instruction has been input, without displaying a specific operation screen W unique to each operator instruction, in response to input of the operator instruction indicated by a depressed one of the softkeys.

It should be understood that the present invention is not limited to the first embodiment. For example, the display device may be devoid of the vibrators 75.

Second Embodiment

The second embodiment is characterized in that the control unit 10 further functions as a frequency storage section 16, a frequency updating section 17, and a change amount updating section 18, as illustrated in the blocks each surrounded by the dashed line in FIG. 2. In the second embodiment, the same element or component as that in the first embodiment is assigned with the same reference sign as that used in the first embodiment, and its description will be omitted.

The frequency storage section 16 is composed, for example, of a part of the storage area of the RAM. According to an aftermentioned action of the frequency updating section 17, the frequency storage section 16 stores therein a frequency with which a depression of each of one or more softkeys included in an operation screen W is detected by a depression detection section 12, in a manner associated with a respective one of the softkeys. The frequency updating section 17 is operable, when a depression of one of the softkeys is detected by the depression detection section 12, to update the depression detection frequency of the one softkey (the frequency with which the depression of the one softkey is detected) stored in the frequency storage section 16.

For example, it is considered that as a cumulative number-of-times value of the detection of a depression of one of the softkeys becomes larger, a depression detection frequency of the one softkey becomes higher. That is, it is considered that a cumulative number-of-times value of the detection of a depression of one of the softkeys represents a depression detection frequency of the one softkey. Thus, the frequency updating section 17 is operable, when a depression of one of the softkeys is detected by the depression detection section 12, to store a cumulative number-of-times value of the detection of the depression of the one softkey, in the frequency storage section 16, in a manner associated with the one softkey.

FIG. 7 is an explanatory diagram illustrating one example of a depression detection frequency of each softkey. As one example, FIG. 7 presents that a depression of the softkey T1 is detected 10 times, wherein a cumulative number-of-times value of the detection of the depression of the softkey T1 stored in the frequency storage section 16 is updated to "10" by the frequency updating section 17. FIG. 7 also presents that a depression of the softkey T2 is detected 5 times, wherein a cumulative number-of-times value of the detection of the depression of the softkey T2 stored in the frequency storage section 16 is updated to "5" by the frequency updating section 17. FIG. 7 further presents that a depression of the softkey T3 is detected once, wherein a cumulative number-of-times value of the detection of the depression of the softkey T3 stored in the frequency storage section 16 is updated to "1" by the frequency updating section 17.

In this situation, for example, when a depression of the softkey T1 is further detected by the depression detection section 12, the frequency updating section 17 is operable to read "10" as the cumulative number-of-times value stored in the frequency storage section 16 in a manner associated with the softkey T1, and cumulatively add 1 thereto. Then, the frequency updating section 17 is operable to update the cumulative number-of-times value stored in the frequency storage section 16 in a manner associated with the softkey T1, to "11" as a result of the cumulative addition.

The frequency updating section 17 is operable, during a shutdown of the complex machine 1, to cause information stored in the frequency storage section 16 to be stored in the ROM. On the other hand, the frequency updating section 17 is operable, in an initial stage of activation of the complex machine 1, to read the information stored in the ROM during the shutdown, from the ROM, and store the read information in the frequency storage section 16. Alternatively, the frequency updating section 17 may be configured to eliminate the operation of, during the shutdown of the complex machine 1, causing information stored in the frequency storage section 16 to be stored in the ROM. That is, every time the complex machine 1 is shut down, information stored in the frequency storage section 16 may be deleted. Alternatively, the frequency updating section 17 may be configured to delete information stored in the frequency storage section 16 at a predetermined time point, e.g., at noon.

The change amount updating section 18 is operable to update a change amount associated with a first one of the softkeys whose cumulative number-of-times value (frequency) stored in the frequency storage section 16 is a first cumulative number-of-times value (first frequency), in such a manner as to become greater than a change amount associated with a second one of the softkeys whose cumulative number-of-times value (frequency) stored in the frequency storage section 16 is a second cumulative number-of-times value (second frequency) less (lower) than the first cumulative number-of-times value.

The change amount updating section 18 is configured to perform the above updating at a predetermined time, such as: when the frequency updating section 17 updates information stored in the frequency storage section 16, in an initial stage of activation of the complex machine 1, on a regular basis, and the like.

For example, assume that the frequency storage section 16 stores therein "10" as the cumulative number-of-times value of the detection of the depression of the softkey T1, "5" as the cumulative number-of-times value of the detection of the depression of the softkey T2, and "1" as the cumulative number-of-times value of the detection of the depression of the softkey T3, as illustrated in FIG. 7. Further, assume that the change amount storage section 15 stores therein information indicating a change amount "2" in association with the softkey T1, information indicating a change amount "1" in association with the softkey T2, and information indicating a change amount "0" in association with the softkey T3, as illustrated in FIG. 5.

In this case, a change amount associated with the softkey T3 having the smallest cumulative number-of-times value of the depression detection is "0". Thus, the change amount updating section 18 is operable to keep the change amount associated with the softkey T3 at "0" without updating it.

On the other hand, the change amount updating section 18 is operable to update the change amount "1" associated with the softkey T2 having "5" as the cumulative number-of-times value of the detection of the depression thereof, in such a manner as to become greater than the change amount "0" associated with the softkey T3 whose cumulative number-of-times value of the depression detection is "1" less than "5", for example, to update it to "2". Further, the change amount updating section 18 is operable to update the change amount associated with the softkey T1 having "10" as the cumulative number-of-times value of the detection of the depression thereof, in such a manner as to become greater than the change amount "2" associated with the softkey T2 whose cumulative number-of-times value of the depression detection is "5" less than "10", for example, to update it to "3".

In a situation where the change amounts associated with the respective softkeys are already stored in such a manner as to become smaller along with a decrease in the cumulative number-of-times value of the depression detection, as illustrated in FIG. 5, the change amount updating section 18 may be configured to omit the operation of updating the cumulative number-of-times values stored in the change amount storage section 15.

Further, the change amount updating section 18 may be configured to update a change amount associated with one of the softkeys whose cumulative number-of-times value of the depression detection is greater than a predetermined threshold value, in such a manner as to become greater than a change amount associated with one of the softkeys whose cumulative number-of-times value of the depression detection is equal to or less than the predetermined threshold value.

For example, assume that the predetermined threshold value is "3". In this case, a change amount associated with each of the softkeys T1 and T2 whose cumulative number-of-times value of the depression detection is greater than "3" may be updated to "2" which is greater than a change amount associated with the softkey T3 whose cumulative number-of-times value of the depression detection is equal to or less than "3". Similarly, the change amount updating section 18 may be configured to classify a softkey depression frequency into a plurality of stepwise ranges by using a plurality of different threshold values, and reduce a degree of updating a change amount associated with each softkey, in association with the ranges, specifically, as the frequency becomes lower. That is, a change amount associated with each softkey may be updated depending on the softkey depression frequency in a stepwise manner.

As above, according to the features of the second embodiment, a change amount associated with each softkey is updated in such a manner as to become smaller as the cumulative number-of-times value of the depression detection becomes smaller. Thus, the brightness of the operation screen W is more largely changed in response of depression of a softkey having a higher depression frequency. This allows a user to more easily recognize a fact that an input of an operator instruction having a high input frequency has been done.

Third Embodiment

The third embodiment is characterized in that the touch panel 73 further functions as a depressing force detection section 73b, as illustrated in the block surrounded by the heavy dashed line in FIG. 2. The depressing force detection section 73b is operable, when a depression of each softkey is detected by the depression detection section 12, to detect a depressing force during the depression.

The third embodiment is also characterized in that a change amount updating section 18 is operable, when a depression of one of the softkeys is detected by the depression detection section 12, to update a change amount stored in the frequency storage section 16 in a manner associated with the one softkey when a depressing force detected by the depressing force detection section 73b is a first depressing force, in such a manner as to become greater than when the depressing force detected by the depressing force detection section 73b is a second depressing force less than the first depressing force. In the third embodiment, the same element or component as that in the first embodiment is assigned with the same reference sign as that used in the first embodiment, and its description will be omitted.

The depressing force detection section 73b is operable to detect a variation in electrostatic capacitance occurring when a user touches a surface of a touch panel 73, and output a detection signal indicative of the variation in electrostatic capacitance to a control unit 10. As a user touches the surface of the touch panel 73 by a stronger depressing force, an area of a region where the user touches the surface of the touch panel 73 becomes larger, and thus the variation in electrostatic capacitance becomes larger. That is, the depressing force detection section 73b is operable to output to the control unit 10 a detection signal indicative of the variation in electrostatic capacitance, on an assumption that the variation in electrostatic capacitance represents a magnitude of a depressing force of a user against the touch panel 73.

As mentioned above, as a user touches the surface of the touch panel 73 by a stronger depressing force, an area of a region where the user touches the surface of the touch panel 73 becomes larger. That is, it is considered that the area of the region where the user touches the surface of the touch panel 73 represents a magnitude of the depressing force of the user against the touch panel 73. Thus, instead of outputting a detection signal indicative of the variation in electrostatic capacitance, the depressing force detection section 73b may be configured to calculate an area of a region where a change in electrostatic capacitance is observed when a user touches the surface of the touch panel 73, and output a detection signal indicative of the area to the control unit 10.

Next, the change amount updating section 18 in the third embodiment will be described in detail. For example, assume that a change amount storage section 15 stores therein information indicating a change amount "2" in association with a softkey T1, information indicating a change amount "1" in association with a softkey T2, and information indicating a change amount "0" in association with a softkey T3, as illustrated in FIG. 5.

FIG. 8 is an explanatory diagram illustrating one example of a relationship between a depressing force of one of the softkeys and a degree of updating a change amount. Further, information prepared by associating a depressing force P of one of the softkeys with a degree U at which the change amount updating section 18 updates a change amount associated with the one softkey (the degree will hereinafter be referred to as "updating degree") as illustrated in FIG. 8 is preliminarily stored in the ROM or the like. In FIG. 8, by using two predetermined reference depressing forces P1 (first depressing force), P2 (second depressing force), the depressing force P is classified into three regions: a region where it is less than the reference depressing force P1; a region where it ranges from the reference depressing force P1 to less than the reference depressing force P2; and a region where it is equal to or greater than the reference depressing force P2.

In this case, the reference depressing force P1 is set to a value less than the reference depressing force P2. Further, the updating degree U is set in such a manner as to become smaller as the depressing force P falls within the range having a smaller depressing force. Specifically, in association with the region where the depressing force P is less than the reference depressing force P1, the updating degree U is set to "0". Further, in association with the region where the depressing force P ranges from the reference depressing force P1 to less than the reference depressing force P2, the updating degree U is set to "1". In association with the region where the depressing force P is equal to or greater than the reference depressing force P2, the updating degree U is set to "2". Respective variations in electrostatic capacitance corresponding to the case where the depressing force P is equal to the reference depressing force P1 and the case where the depressing force P is equal to the reference depressing force P2 are set based on experimental values from a test operation or the like, and preliminarily stored in the ROM or the like.

For example, assume that a depression of the softkey T1 is detected by a depression detection section 12. Further, assume that a variation in electrostatic capacitance indicated by a detection signal output from the depressing force detection section 73b is less than a variation in electrostatic capacitance corresponding to the reference depressing force P1. In this case, the change amount updating section 18 determines that a depressing force P of the softkey T1 is less than the reference depressing force P1. Then, the change amount updating section 18 is operable to acquire "0" as the updating degree U associated with the region where the depressing force P is less than the reference depressing force P1, from the information in FIG. 8. The acquired updating degree U is "0". Thus, the change amount updating section 18 is operable to keep a change amount stored in the change amount storage section 15 in a manner associated with the softkey T1, at "2" without updating it.

On the other hand, assume that a variation in electrostatic capacitance indicated by a detection signal output from the depressing force detection section 73b is equal to or greater than the variation in electrostatic capacitance corresponding to the reference depressing force P1, and less than a variation in electrostatic capacitance corresponding to the reference depressing force P2. In this case, the change amount updating section 18 determines that the depressing force P of the softkey T1 is equal to or greater than the reference depressing force P1 and less than the reference depressing force P2. Then, the change amount updating section 18 is operable to acquire "1" as the updating degree U associated with the region where the depressing force P is equal to or greater than the reference depressing force P1 and less than the reference depressing force P2, from the information in FIG. 8. Then, the change amount updating section 18 is operable to add the acquired updating degree "1" to the change amount "2" stored in the change amount storage section 15 in a manner associated with the softkey T1. In this way, the change amount updating section 18 can update the change amount stored in the change amount storage section 15 in a manner associated with the softkey T1, to "3".

Further, assume that a variation in electrostatic capacitance indicated by a detection signal output from the depressing force detection section 73b is equal to or greater than the variation in electrostatic capacitance corresponding to the reference depressing force P2. In this case, the change amount updating section 18 determines that the depressing force P of the softkey T1 is equal to or greater than the reference depressing force P2. Then, the change amount updating section 18 is operable to acquire "2" as the updating degree U associated with the region where the depressing force P is equal to or greater than the reference depressing force P2, from the information in FIG. 8. Then, the change amount updating section 18 is operable to add the acquired updating degree "2" to the change amount "2" stored in the change amount storage section 15 in a manner associated with the softkey T1. In this way, the change amount updating section 18 can update the change amount stored in the change amount storage section 15 in a manner associated with the softkey T1, to "4".

Figure 9:
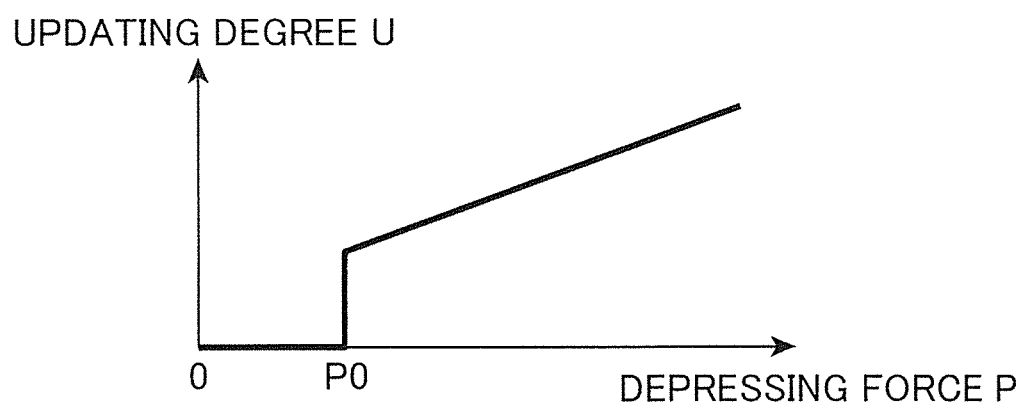
FIG. 9 is an explanatory diagram illustrating another example of the relationship between a depressing force of a softkey and a degree of updating a change amount, different from that in FIG. 8.

In the third embodiment, the change amount updating section 18 is configured to use information prepared by setting a region of the depressing force P in a multi-stage manner as illustrated in FIG. 8 (in FIG. 3, three stages), and setting the updating degree U in a multi-stage manner in association with the respective regions (the information illustrated in FIG. 8). However, the present invention is not limited thereto. FIG. 9 is an explanatory diagram illustrating another example of the relationship between the depressing force of one of the softkeys and the degree of updating the change amount, different from that in FIG. 8. For example, the change amount updating section 18 may be configured to use information set such that, when the depressing force P is equal to or greater than a predetermined reference depressing force P0, the updating degree U is continuously changed in association with the depressing force P, specifically, in such a manner as to become smaller along with a decrease in the depressing force P, as illustrated in FIG. 9, instead of the information illustrated in FIG. 8. In this case, the reference depressing force P0 may be set to any value of 0 or more.

As above, according the features of the third embodiment, a change amount to be set when a softkey is depressed by a first depressing force is greater than a change amount to be set when the softkey is depressed by a second depressing force less than the first depressing force. Thus, brightness of an operation screen W is more largely changed in response of depression of a softkey by a stronger force. This allows a user to more easily recognize a fact that he/she strongly depresses a softkey.

Fourth Embodiment

The fourth embodiment is characterized in that the control unit 10 further functions as a vibratory drive section 19 and a vibration adjustment section 20, as illustrated in the blocks each surrounded by the on-dot chain lines in FIG. 2. In the fourth embodiment, the same element or component as that in the first to third embodiments is assigned with the same reference sign as that used in the first to third embodiments, and its description will be omitted.

The vibratory drive section 19 is operable, when a depression of one of the softkeys is detected by a depression detection section 12, to supply an electric signal (current or voltage) having a predetermined signal level, to a vibrator 75. Thus, the vibratory drive section 19 is operable to vibrate an LCD 74 with a predetermined reference amplitude. In the following description, an electric signal to be supplied from the vibratory drive section 19 to the vibrator 75 so as to vibrate LCD 74 with the reference amplitude will be referred to as "reference amplitude signal".

The amplitude adjustment section 20 is operable to change an amplitude with which the LCD 74 is to be vibrated by the vibratory drive section 19 when a depression of one of the softkeys is detected by the depression detection section 12, from the reference amplitude by a change amount stored in the change amount storage section 15 in a manner associated with the depressed softkey.

For example, assume that a change amount storage section 15 stores therein information indicating a change amount "2" in association with a softkey T1, information indicating a change amount "1" in association with a softkey T2, and information indicating a change amount "0" in association with a softkey T3, as illustrated in FIG. 5. Further, for example, assume that a depression of the softkey T1 is detected by the depression detection section 12.

In this case, the vibration adjustment section 20 is operable to acquire the change value "2" associated with the softkey T1, from the change amount storage section 15. Then, the vibration adjustment section 20 is operable, based on the change amount "2" indicated by the acquired information, to instruct the vibratory drive section 19 to supply an electric signal having a signal level greater than, e.g., 1.2 times greater than, that of the reference amplitude signal, to the vibrator 75. This allows the LCD 74 to be largely vibrated as compared to the reference amplitude, by an amplitude corresponding to the change value "2".

On the other hand, assume that a depression of the softkey T3 is detected by the depression detection section 12. In this case, the vibration adjustment section 20 is operable to acquire the change value "0" associated with the softkey T3, from the change amount storage section 15. The change amount indicated by the acquired information is "0". Thus, the vibration adjustment section 20 is operable to instruct the vibratory drive section 19 to supply an electric signal having the same signal level as that of the reference amplitude signal, to the vibrator 75. This allows the LCD 74 to be largely vibrated as compared to the reference amplitude, by an amplitude corresponding to the change value "+0". That is, the LCD 74 is vibrated with the same amplitude as the reference amplitude.

Alternatively, instead of setting an amplitude with which the LCD 74 is to be vibrated, to become greater than the reference amplitude by the change amount associated with a depressed one of the softkeys, as described above, the vibration adjustment section 20 may be configured to set the amplitude to become smaller than the reference amplitude by the change amount associated with a depressed one of the softkeys. That is, in this case, the LCD 74 is vibrated with an amplitude smaller than the reference amplitude by an amount corresponding to the change amount associated with a depressed one of the softkeys.

The change amount stored in the change amount storage section 15 is not limited to numerical values equal to or greater than 0, as described above. For example, the change amount stored in the change amount storage section 15 may include a numerical value less than 0 (i.e., a negative numerical value). In conformity thereto, the vibration adjustment section 20 may be configured to, when a change value associated with a depressed one of the softkeys is a numerical value less than 0, instruct the vibration control section 19 to supply an amplitude with which the LCD 74 is to be vibrated, as an electric signal having a signal level less than that of the reference amplitude signal by an amount corresponding to an absolute value of the change amount.

As above, according to the features of the fourth embodiment, when a user depresses one of the softkeys so as to input an operator instruction, the LCD 74 is vibrated depending on the depressed softkey, and a degree of the vibration is changed by a corresponding one of the change amounts associated with the respective softkeys. Thus, a user can quickly recognize which of the softkeys has been depressed, i.e., what kind of operator instruction has been input, without displaying a specific operation screen W unique to each operator instruction, in response to input of the operator instruction indicated by a depressed one of the softkeys.

It should be understood that the display controller 100 of the present invention may be employed in any other suitable electronic apparatus other than the complex machine 1. For example, the display controller 100 of the present invention may be employed in various types of electronic apparatuses, such as: an image forming apparatus including a copy machine, a printer apparatus and a facsimile apparatus; a scanner apparatus, a personal computer, a portable phone, a microwave oven, a washing machine, a car navigation apparatus, and a game machine.

The invention claimed is:

1. A display controller comprising:
a control unit including a CPU, a ROM and a RAM;
an LCD including a liquid crystal panel with a surface to display an image and a backlight operable to illuminate the entire surface of the liquid crystal panel; and
a touch panel laminated above the LCD; wherein
the control unit functions as:
a display control section operable to display thereon an operation screen on the liquid crystal panel at a predetermined reference brightness by instructing the backlight to illuminate the entire surface of the liquid crystal panel at the predetermined reference brightness, the operation screen having one or more instruction images arranged thereon and each being depressible to input a specific operator instruction;
a depression detection section operable to detect a depression of each of the instruction images by using the touch panel;
a brightness adjustment section operable, when a depression of one of the instruction images is detected by the depression detection section, to instruct the display control section to change brightness of the entire operation screen from the reference brightness by a change amount preliminarily associated with the one instruction image;
a frequency storage section storing therein a frequency with which a depression of each of the instruction images is detected by the depression detection section;
a frequency updating section operable, when a depression of one of the instruction images is detected by the depression detection section, to update the frequency of the one instruction image stored in the frequency storage section;
a change amount updating section operable to set a change amount associated with a first one of the instruction images whose frequency stored in the frequency storage section is a first frequency, in such a manner as to become greater than a change amount associated with a second one of the instruction images whose frequency stored in the frequency storage section is a second frequency less than the first frequency; and
the change amount updating section updates the change amount associated with each instruction image in such a manner as to become smaller as the cumulative number-of-times value of the depression detection by the depression detection section becomes smaller.

2. The display controller as recited in claim 1, which further comprises:
vibrators operable to vibrate the entire LCD; wherein
the control unit further functions as
a vibratory drive section operable, when a depression of one of the instruction images is detected by the depression detection section, to vibrate the LCD with a predetermined reference amplitude by the vibrators; and
an amplitude adjustment section operable to change an amplitude with which the LCD is to be vibrated by the vibratory drive section when a depression of one of the instruction images is detected by the depression detection section, from the reference amplitude by a change amount preliminarily associated with the one instruction image.

3. An electronic apparatus comprising:
the display controller as recited in claim 1; and
the control unit further functions as
an instruction acceptance section operable, when a depression of one of the instruction images is detected by the depression detection section, to accept the specific operator instruction indicated by the one instruction image.

* * * * *